United States Patent [19]
Wiley et al.

[11] Patent Number: 6,154,219
[45] Date of Patent: Nov. 28, 2000

[54] SYSTEM AND METHOD FOR OPTIMALLY PLACING LABELS ON A MAP

[75] Inventors: John-Michael Wiley, Redmond; Mark B. Atherton, Issaquah, both of Wash.

[73] Assignee: Microsoft Corporation, Redmond, Wash.

[21] Appl. No.: 08/980,846

[22] Filed: Dec. 1, 1997

[51] Int. Cl.[7] .................................................. G06T 17/00
[52] U.S. Cl. ........................................... 345/433; 345/435
[58] Field of Search .................................. 345/433, 435, 345/342, 344; 364/400

[56] References Cited

U.S. PATENT DOCUMENTS

| | | | |
|---|---|---|---|
| 5,420,968 | 5/1995 | Johri ........................................... | 345/433 |
| 5,428,733 | 6/1995 | Carr ............................................ | 345/342 |
| 5,553,211 | 9/1996 | Uotami ....................................... | 345/435 |
| 5,684,940 | 11/1997 | Freeman et al. ........................... | 345/438 |
| 5,689,717 | 11/1997 | Pritt ........................................... | 707/512 |
| 5,724,072 | 3/1998 | Freeman et al. ........................... | 345/436 |
| 5,988,853 | 11/1999 | Kim et al. .................................. | 364/400 |

*Primary Examiner*—Mark K. Zimmerman
*Assistant Examiner*—Albert K. Lee
*Attorney, Agent, or Firm*—Jones & Askew, LLP

[57] ABSTRACT

Labeling objects on a computerized map in an efficient manner while avoiding collisions with both more and less important objects. A first list contains objects to be labeled on the computerized map, the objects being both points and non-points. Each of the objects in the first list has a label selection priority. A second list contains the a collection of objects from the first list having the lowest label selection priority. The system can draw each object in the first list to the computerized map in ascending order of label selection priority. As each object is drawn, the system labels the object with a label while avoiding collisions between the label and objects in the second list having a higher label selection priority than the object.

20 Claims, 5 Drawing Sheets

SYSTEM AND METHOD FOR OPTIMALLY PLACING LABELS ON A MAP

FIELD OF THE INVENTION

This invention relates in general to labeling objects on a computerized map, and in particular to labeling objects on a display of a computerized map such that as many labels as possible can be placed on the map without colliding with other labels or point objects, such as cities, towns, airports or the like.

BACKGROUND OF THE INVENTION

Available today are computer programs known as "computerized mapping programs." Those programs can display digital maps, often complete with detailed road networks down to the city-street level. Typically, a user can input a location and the mapping program will display a map on-screen of the selected location. The mapping program generally displays several features of the map, such as countries, states, counties, cities, hospitals, churches, and the like. For the purpose of this discussion, each feature which can be displayed on the map is termed an "object."

Each object on the display will typically have a label identifying what the object is. For instance, the city Atlanta will appear on the map as a point object with the label "Atlanta" positioned near the point. For the purpose of this discussion, a "point" is an object on the map which is represented by a discrete point symbol, such as a city. In contrast are "area" objects, such as countries or states, and "line" objects, such as rivers.

Each type of object can be labeled slightly differently, based on cartographic standards in use in the mapping industry. Each type of object has several available label positions of varying cartographic preference. For instance, the label position to the northeast of a point symbol is the cartographically preferred label position for a point. If that position is not available, then other label positions can be chosen, such as the southeast position, the northwest position, or the southwest position, in descending order of cartographic preference.

Areas also have label positions of descending cartographic preference. For instance, the most cartographically preferred area label position is in the center of the area. Other positions are also available for an area label, such as above the center of the area or below the center of the area. Also, the label size and character spacing can be reduced to help place the label. Likewise, line objects are preferably labeled with a straight line label, positioned somewhere collinear with the line.

Existing mapping programs have various systems for labeling the objects which are displayed on a map. For instance, a typical mapping program in use today simply places labels in a pre-determined position near the object. Changing the display does not affect the label position. Such a system is considered a static system. Static systems suffer from many problems. For instance, modern mapping programs allow the user to request a particular object to be displayed and labeled, such as the user's residence or office. In that situation, the mapping program displays the ordinary map features, such as cities and states, as well as the user's requested object with a label. The object which the user requests is displayed regardless of what objects it may collide with. The term "collide" means that two objects on a map attempt to collocate in the same location on a display of the map.

Accordingly, the user's requested object can collide with an existing map feature. Avoiding collision is a premium concern in computerized mapping programs. In a static system, there is no way to relocate a pre-determined label to another position. As a result, often the user's requested object will prevent displaying either an existing object, or the label for that object. A system which can display as many objects with their respective labels as possible is desirable.

Also, most mapping programs today allow a user to "zoom" in and out, meaning that the scale factor can be changed. At each scale, different objects may be visible. For instance, at one scale factor, a hospital may be visible, while panning out makes the hospital insignificant with respect to the other objects which are displayed, such as cities or counties. Accordingly, a system which can relocate labels for objects in response to collisions between objects at different scales is desirable.

Two related systems which can relocate labels for objects, termed "dynamic systems," make use of a system "score" or a "temperature." In those systems, the location of each of the objects and labels which can be displayed is determined. The score relates to the total number of collisions between labels and objects to be displayed as well as the number of objects which are not in cartographically preferred positions. The systems attempt to minimize the score of the display by relocating each label to a new position and testing the new score of the system after the move. If the move makes the score better, than the move is kept. If a temperature system is used, a move which actually makes the score worse may be kept in a small number of cases. After all objects have been examined in a single pass, the temperature is reduced, which has the effect of making it harder to accept bad moves. The temperature system, where some bad moves are accepted, is called "Simulated Annealing." A system which uses a score but not a temperature, which only accepts good moves, is called a "Gradient Descent."

In those systems, the number of collisions is first determined and stored in memory. Then, a random relocation is made of a label for an object, and the number of collisions is again determined. If the number of collisions decreases, then the label is left in the new position. If the number of collisions increases, then a random number function combined with the temperature, if applicable, are used to determine if the new position is kept. As the temperature decreases, the probability of keeping such a move decreases. The system then moves a second label to a new position. Again the number of collisions is determined, and the new label position is either maintained or rejected, based on the same criteria. The system repeats this process for every label. Once all labels have been visited, the temperature is reduced and the algorithm begins again with the first object to be labeled. The system repeats this process as many times as necessary to minimize the system score below a pre-determined threshold or until a minimum reduction in score is achieved in a pass through all the objects. Often, a single object label will be relocated several times before the minimum score is achieved. A severe problem with these types of systems is the time cost of performing a sufficient number of computations to achieve acceptable results. Because of the random nature of the testing, the computational time makes the Gradient Descent and Simulated Annealing systems undesirable for applications desiring robust performance.

Another system is used in mapping programs which attempt to locate labels in such a manner as to avoid colliding with currently displayed objects. For instance, some mapping programs employ a "greedy algorithm," which seeks to place a label corresponding to an object in a given label position. If a collision occurs between the label and an object which has already been displayed, and which has been identified as desirable, the label will be relocated to any label position which is not already occupied. While the greedy algorithm system improves computational time, this system suffers from several problems as well. For instance, greedy algorithm systems do not anticipate the location of objects yet to be displayed when placing a label for an object. In other words, a greedy algorithm system places a label in the first available label position which is not already occupied by an existing object or label. A system which seeks to avoid currently displayed objects, as well as objects which remain to be displayed, is desirable.

A system and method for labeling objects on a computerized map in an efficient manner, while avoiding collisions with both more important objects and lesser important objects has eluded those skilled in the art. There is a need for a system which can quickly label objects while avoiding currently displayed objects, as well as objects which remain to be displayed.

SUMMARY OF THE INVENTION

The present invention meets the needs described above by providing a system for placing a label for an object on a computerized map by evaluating multiple possible positions for the label, and placing the label in a position which optimizes the number of objects on the map which can be labeled. The present invention evaluates each label position based on collisions with objects which have already been displayed, as well as those which remain to be displayed. By not removing or relocating an object's label once it has been placed, the present invention provides a system which is both computationally efficient, and results in a more optimum number of objects and labels displayed than existing mapping programs.

In one aspect, the present invention is a computer-readable medium having computer-executable instructions for labeling objects on a computerized map. A first list contains objects to be labeled on the computerized map. The objects can be points, areas, and lines. Each of the objects in the first list has a label selection priority which is an indicator of the object's desirability to be displayed. A second list contains certain objects selected from the first list. In an exemplary embodiment, the objects being the most desirable to display have the lowest label selection priorities and are considered the most important. In the exemplary embodiment, the second list contains the most important points from the first list. An object in the first list is displayed on the computerized map based on the object's label selection priority. The object is labeled with a label that avoids previously drawn objects and that attempts to avoid collisions with objects from the second list.

Another aspect of the present invention provides a method in a computer system for labeling objects on a computerized map. The invention provides a list of objects to be labeled on the computerized map. The objects can be points, areas, lines or the like. Each of the objects has a label selection priority. Certain objects in the list of objects having the lowest label selection priority are identified. Then, a collision penalty is associated with each of the identified objects. Next, the objects in the list are labeled by evaluating multiple possible label positions for a first object to determine a desirable label position for the label. As part of the evaluation process, if a label position collides with an object which has already been drawn, the label position is eliminated as a possibility. Once the desirable label position is determined, the label associated with the first object is displayed in the desirable label position.

In yet another aspect, the invention can evaluate the label positions associated with a first object by determining whether a label position for the object collides with an identified object, and, if so, calculates a penalty for the label position. The penalty is based on a combination of a cartographic penalty and a collision penalty. The cartographic penalty is a function of the cartographic preference of the label position, meaning where in the hierarchy of cartographic preferences the label position lies. The collision penalty is a value associated with the identified object with which the label position collides. The invention considers both objects which have already been displayed, and objects which remain to be displayed. When it has evaluated all of the label positions associated with the first object, the invention places the label in the label position having the lowest penalty.

These and other features, advantages, and aspects of the present invention may be more clearly understood and appreciated from a review of the following detailed description of the disclosed embodiments and by reference to the appended drawings and claims.

DETAILED DESCRIPTION OF EXEMPLARY EMBODIMENTS

The present invention displays an object and a label for that object on a computerized map by evaluating multiple possible positions for the label, and placing the label in a position which optimizes the number of objects on the map which can be labeled. In one embodiment, the invention is incorporated into a computerized mapping application program entitled "EXPEDIA TRIPPLANNER", marketed by Microsoft Corporation of Redmond, Washington.

Briefly described, the present invention identifies objects, including points, areas, and lines, to be labeled on a display of a computerized map. The objects are assigned label selection priorities, which identify each object's desirability to be displayed. In the exemplary embodiment, those objects being the most desirable to display have the lowest label selection priorities and are considered the most important. All of the objects are mapped to a display to identify their locations on the display.

A list is created of certain of the most important objects to be displayed, and those objects are each assigned a collision penalty based on the object's label selection priority. In one exemplary embodiment, the certain objects included in the list are only the most important points, as opposed to lines and areas, which are to be displayed on the map. Then, each object is displayed, and a label is placed in a label position associated with the object. The result is that each label placement seeks to avoid colliding not only with more important objects, but also with objects of less importance.

Determining the label position is an iterative process. For each object, multiple label positions can be evaluated. First the label position is checked to see if it collides with an object or a label which has already been drawn. If so, then that label position is immediately rejected. If not, then the label position is assigned a penalty. The penalty is calculated by adding two penalty values, a cartographic penalty associated with deviating from the preferred label position, and the collision penalty associated with other objects with which the label position collides. Once all label positions have been evaluated, then the label is placed in the label position with the lowest penalty.

Figure 1:
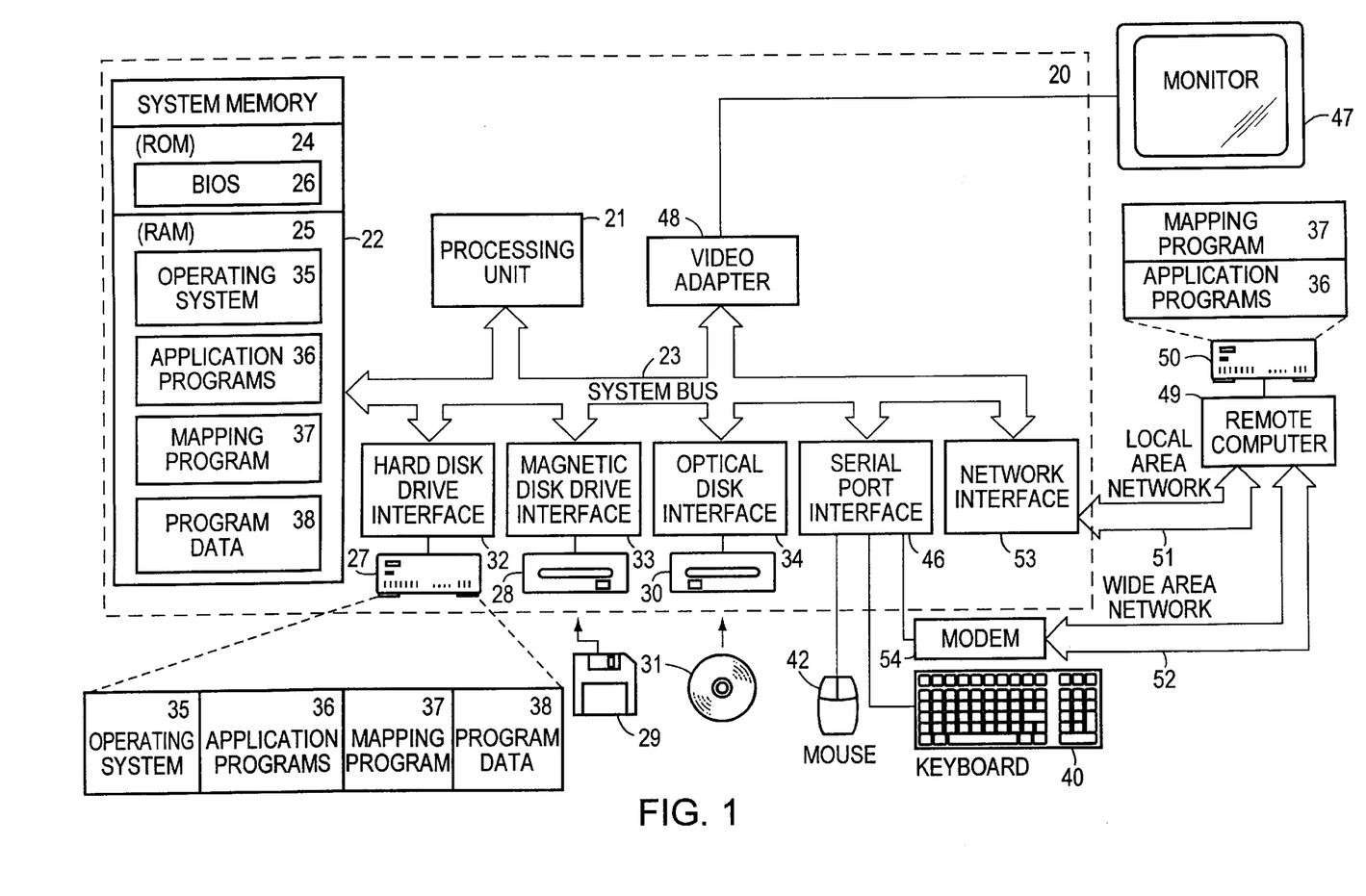
FIG. 1 is a block diagram of a personal computer illustrating an operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a computer mapping program 37 having an embodiment of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
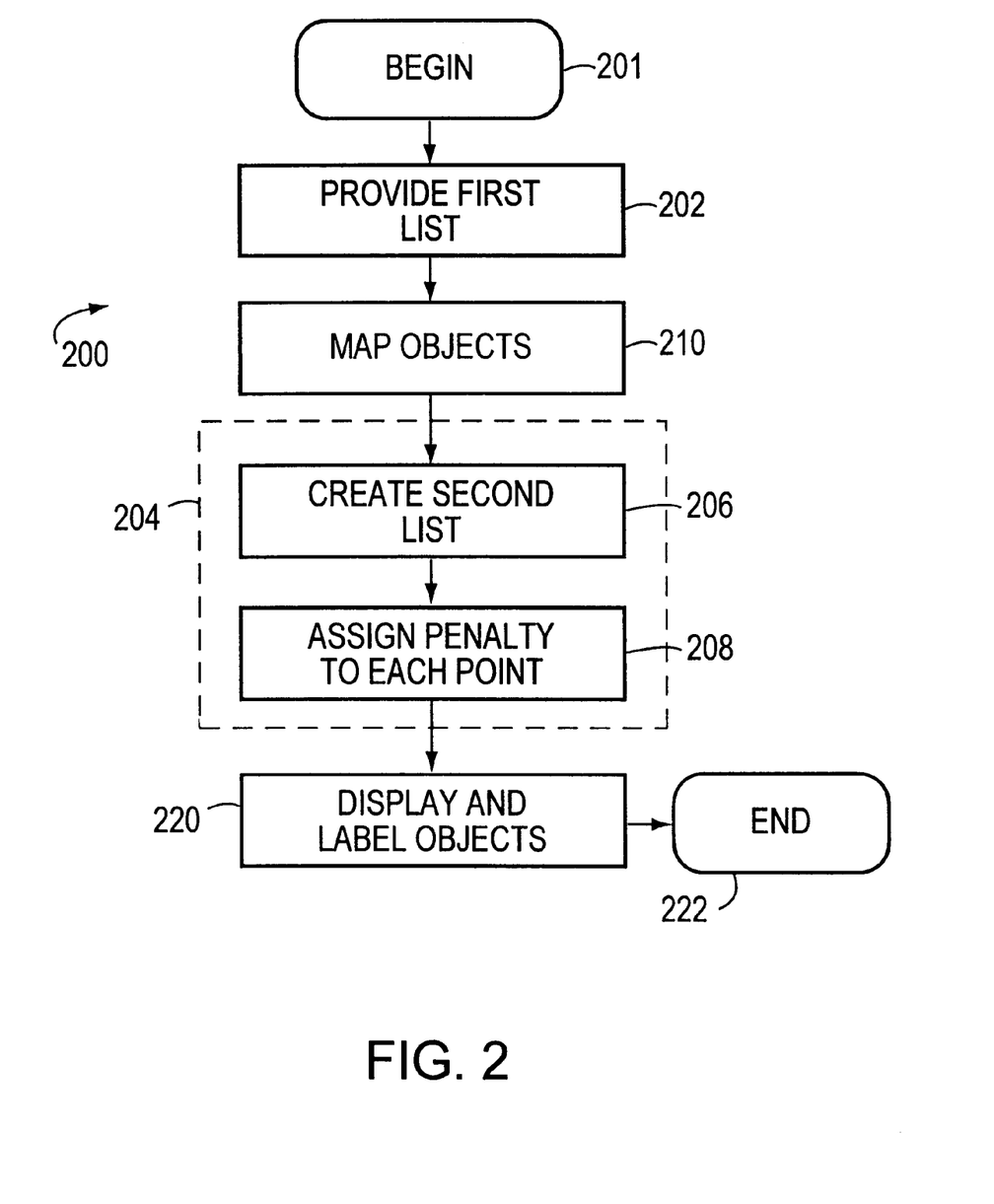
FIG. 2 is a flow chart illustrating steps to generate a computerized map display for an embodiment of the present invention.

An exemplary embodiment of the present invention can be implemented in the computer mapping program 37 for displaying objects having labels on a computerized map. One exemplary embodiment of the present invention is illustrated in FIG. 2, which depicts the steps performed in computer-executable code to place labels for objects on the computerized map. The method 200 enters at the beginning step 201. At beginning step 201, the method has received a request from a user to display a map. The map can represent the geographical region that the user has requested to display, including several objects to be displayed.

At step 202, the method provides a first list containing all of the objects, both points and non-points, such as areas and lines, for display on the map. Each of the objects in the first list has been assigned a "label selection priority." The label selection priority is a value which orders the objects to be labeled into a prioritized display order. The objects which are more important, or more desirable to display, have a lower label selection priority. Thus, for example, countries can have a lower label selection priority than states, which can have a lower label selection priority than major cities, which can have a lower label selection priority than minor cites. For the purpose of this discussion, the term "senior object" means an object with a lower label selection priority, meaning it will be drawn or labeled first. The term "junior object" means an object which still remains to be drawn or labeled. For instance, if a first object is drawn before a second object, then the first object is senior to the second object. The second object is junior to the first object. Also, a label can be a senior object, if the object associated with the label has already been displayed.

At step 210, all the objects in the first list are mapped to the display. For the purpose of this discussion, the term "mapped" means the actual location of the object on the display is determined and stored in memory. The terms "displayed" or "drawn" mean that the object is actually drawn to the display. In other words, an object can be mapped without being displayed, so that its location on the map is determined, but it is not yet visible to the user.

In the exemplary embodiment, lines and areas are drawn while the first list is being constructed at step 202, before labeling the objects begins. Those skilled in the art will appreciate that drawing the lines and areas can be postponed until after all of the label positions have been identified or could have been done before the first list is constructed at step 202.

Next, a "weighted collision array" is built, represented by the steps within the dashed lines forming a box 204. At step 206, a second list is created by selecting the most important points from the first list. As mentioned, the most important points are those having the lowest priority. It is not necessary that all of the points in the first list be represented in the second list. For instance, the method 200 may only select the fifty most important points from the first list to be in the second list. In the exemplary embodiment, only points are selected. However, it will be apparent to those skilled in the art that the second list can contain all of the points from the first list, or a combination of points and non-points.

At step 208, a "collision penalty" is assigned to a point in the second list. In the exemplary embodiment, the collision penalty is assigned to a region around each point, rather than simply the point symbol itself, to avoid placing a label for another object so near a point that confusion arises as to the label's associated object, even though the label does not actually collide with the point itself. The region can be a "collision rectangle," which is a small invisible rectangle drawn around and concentric with the point. A collision with the collision rectangle is the equivalent of a collision with the point itself. However, for simplicity of discussion, a collision with the region immediately around each point will be treated as a collision with the point itself.

The collision penalty is a value based on the label selection priority of the point. The more important the point, the higher the collision penalty. The collision penalty is used, in subsequent steps, to evaluate whether to collide with (and prevent the display of) the point or a label when displaying or labeling a more senior object.

Next, at step 220, the method 200 begins displaying and labeling the objects in the first list in ascending order by label selection priority. Each object is evaluated as it is displayed to avoid colliding with a senior object. As each object is drawn, its label is evaluated in several label positions associated with that object to avoid colliding with more senior objects, as well as more junior objects (objects which remain to be displayed). In this manner, this exemplary embodiment overcomes the problems in the prior art by not only considering more important objects when labeling, but also considering less important objects. The present embodiment will place an object's label in a less cartographically preferable position if the penalty for the label position is outweighed by the desire to display the more junior object. The labeling step 220 is discussed in more detail with reference to FIG. 3. It will be apparent to those skilled in the art that the positions for the labels can be determined at this step, and display can occur at anytime after the position is determined. It is only important that the position be determined so that junior objects can avoid collisions with the determined position.

At step 222, the method has completed displaying and labeling all the objects in the first list that could be displayed. Accordingly, the method 200 ends, and awaits further user input.

Figure 3:
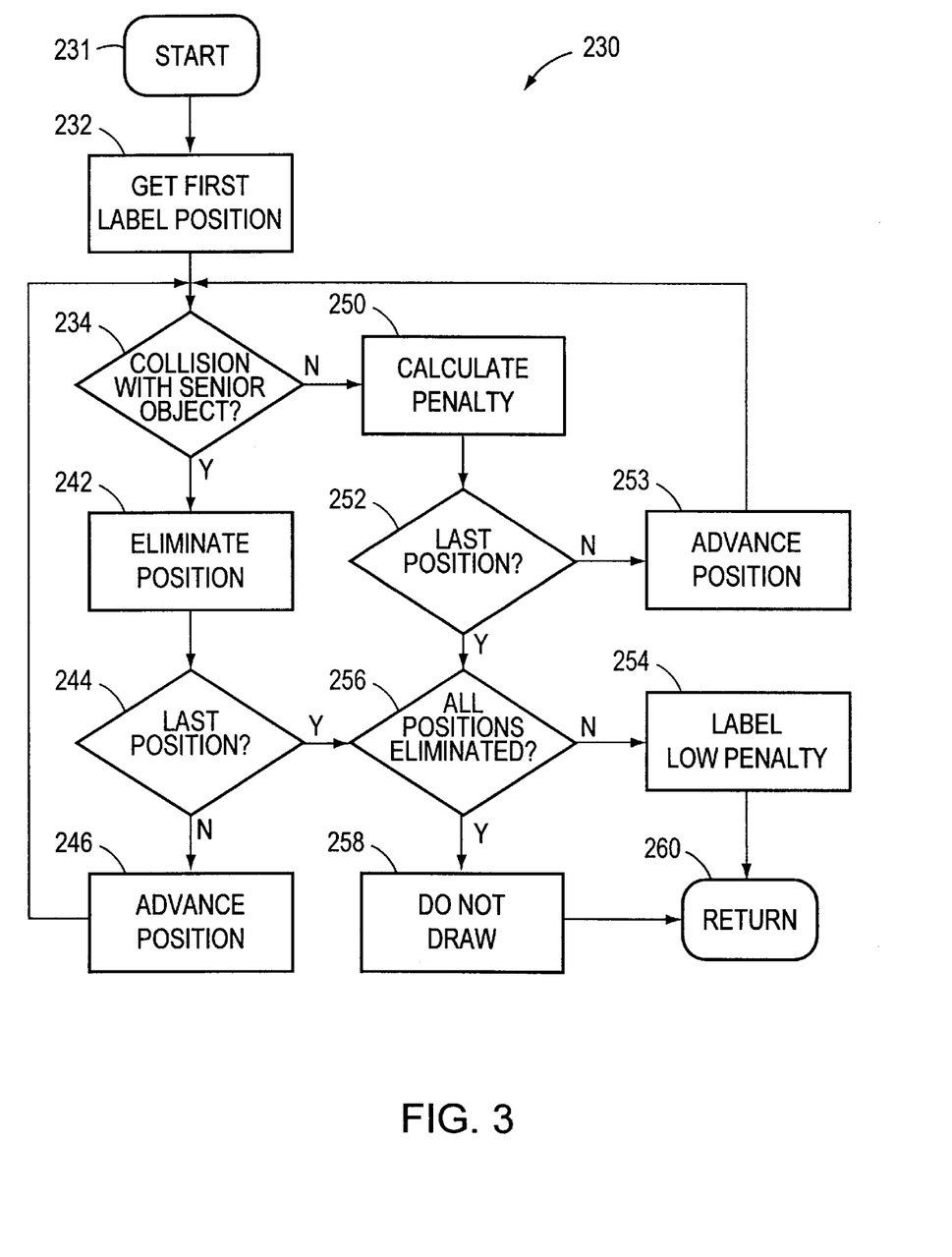
FIG. 3 is a flow chart illustrating steps to label prioritized objects on a computerized map for an embodiment of the present invention.

FIG. 3 is a flow chart detailing the labeling step 220 of the flow chart in FIG. 2, implemented by a method 230. The method 230 begins at starting step 231. At step 231, the weighted collision array has been built, the positions and penalties associated with each point in the second list are in memory, and the method is ready to attempt to label an object.

The object may not be displayed until after the method 230 determines that the object can be labeled. For instance, if the object is a point, and the object will not be displayed without a label, then the object is not displayed until an acceptable label position has been identified. On the other hand, if the object is an area or a line, such as a county or a river, the object may be displayed before it is determined if a label position is available because a county or a river can be displayed and not labeled without creating confusion. A collision occurs if a label position is either occupied by an object which has already been displayed (a senior object), or if the label position corresponds to a mapped location for a point in the second list (a junior object).

At step 232, the method selects a first label position associated with the first object to be evaluated, and proceeds to decision block 234. At decision block 234, a test determines whether the first label position collides with a senior object. In the exemplary embodiment, a senior object is not moved or removed from the display in the event of a collision. Because each of the objects in the first list is displayed in order of importance, by ascending label selection priority, junior objects are by definition less desirable to display. Therefore, the exemplary embodiment treats senior objects as immovable. For that reason, if the first label position collides with a senior object, the method 230 proceeds to step 242, which eliminates the current label position as a candidate label position, and then proceeds to decision block 244.

At decision block 244, a test is performed to determine whether the label position eliminated at step 242 was the last available label position for the object. As discussed above, each object can have multiple label positions of varying cartographic preference. For instance, in the exemplary embodiment, a label for a point can be placed in label positions including the northeast (most cartographically preferred), southeast, northwest, southwest, north-northwest, or south-southwest positions (in descending order of cartographic preference). A "cartographic penalty" is associated with each label position. The most preferred label position has the lowest cartographic penalty, and each other label position has a higher cartographic penalty, depending upon how cartographically undesirable the label position is. Label positions for other objects, such as areas and lines, also have cartographic penalties. In the exemplary embodiment, the cartographic penalties for each label position for each object are pre-determined.

If the test at decision block 244 indicates that the current label position is not the last available label position for the object, then the method 230 proceeds to step 246, which advances the current label position to the next available label position. In the exemplary embodiment, the next available label position for a point is the southeast label position. However, if the object is an area, then the next available label position could be a combination of changing the font typeface size, spacing, or relocating the label. The label position is not limited to a physical location on the map. Advancing to the next label position could involve modifying the label itself, such as decreasing the font size, to avoid a collision.

Once the method has advanced to the next label position, the method returns to decision block 234, and the test is again conducted to determine if the new label position collides with a senior object. If so, then the method performs again as discussed above with respect to step 242.

If, at decision block 234, there is no collision, or the collision is not with a senior object, then the method 230 proceeds to step 250, which calculates a penalty. The penalty is a combination of the collision penalty (discussed above respecting FIG. 2) associated with the object or objects with which the current label position collides, and the cartographic penalty associated with the current label position. The penalty for the current label position is stored prior to proceeding to decision block 252.

At decision block 252, a test is conducted to determine whether the current label position is the last available label position. If the current label position is not the last available, the method proceeds to step 253, which advances the label position to the next available label position and returns to decision block 234, which performs again as discussed above. If, however, the tests at either decision block 252 or decision block 244 determine that the current label position is the last available label position, then the method proceeds to decision block 256, and a test is conducted to determine if all of the available label positions have been eliminated. If not, then the method 230 proceeds to step 254. When the method reaches step 254, all of the available label positions have been evaluated, and the penalty associated with each available label position has been calculated. Accordingly, the label for the object is placed in the label position having the lowest penalty.

However, if at decision block 256 it is determined that all of the available label positions have been eliminated, then the method proceeds to step 258. As mentioned, a senior object is not removed or relocated to accommodate a junior object. Accordingly, it is possible that every available label position for an object collides with a senior object. In that situation, the method reaches step 258, and a determination is made whether the object can be displayed without a label. In the exemplary embodiment, if the object cannot be displayed without a label, then the object is not displayed. From step 258 or step 254, the method proceeds to the end block 260. When the method 230 ends, it accepts the next object in the first list, reinitiates at step 231, and again attempts to display and label the next object in the first list.

Figure 4:
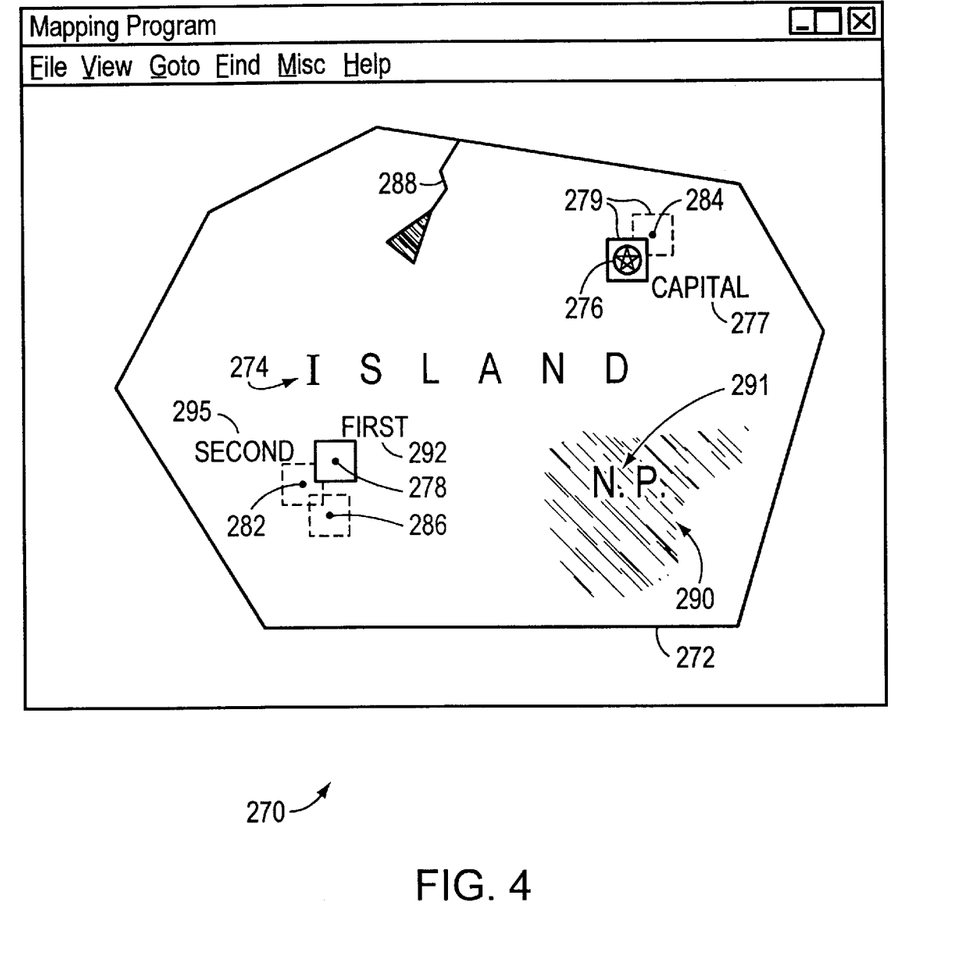
FIG. 4 is an illustration of a screen display showing objects labeled and displayed by a computerized mapping program incorporating an embodiment of the present invention.

FIG. 4 illustrates a sample screen display 270 of a computerized mapping program in accordance with an exemplary embodiment of the present invention. The screen display 270 depicts a map which a user has requested to view. The map displays an Island 272 containing a variety of features to be displayed. For instance, the Island 272 includes a capitol city 276, a first major city 278, a second major city 282, a first minor city 284, a second minor city 286, a river 288, and a national park 290.

As the mapping program begins displaying the features of the Island 272, the mapping program maintains a first list of the objects which remain to be displayed, including all of the features mentioned above. Each of the objects in the first list has a label selection priority. The more important objects have a lower label selection priority than the lesser important objects. For instance, capitol city 276 is more important than first minor city 284, and accordingly has a lower label selection priority.

Some of the objects in the first list are immediately displayed, such as lines and areas. Accordingly, the Island 272 and the river 288 are immediately displayed, but not labeled. Before the points in the first list are displayed, the mapping program builds a weighted collision array. The weighted collision array is based on a second list. The second list is created by including the most important points from the first list. For simplicity of discussion, all of the points from the first list are included in the second list of this disclosed example. However, it will be apparent to those skilled in the art that the first list could also contain thousands of objects including hundreds of points. For that reason, fewer than all of the points from the first list can be chosen for the second list. In another example, for instance, a second list could contain the fifty most important points from a first list containing two hundred points.

In the disclosed example, the capitol city 276, the first major city 278, the second major city 282, the first minor city 284, and the second minor city 286 are included in the second list because, as mentioned, those objects are the most important points from the first list. The Island 272, the river 288, and the national park 290 are examples of objects in the first list which are not points, and are consequently omitted from the second list and the weighted collision array. The following table, listing the objects in each list in ascending order of label selection priority, is presented for clarity.

| First List | Second List |
| --- | --- |
| Island 272 | Capitol City 276 |
| National park 290 | First major city 278 |
| Capitol city 276 | Second major city 282 |
| First major city 278 | First minor city 284 |
| Second major city 282 | Second minor city 286 |
| River 288 | |
| First minor city 284 | |
| Second minor city 286 | |

The weighted collision array includes the screen locations of the points in the second list, as well as a collision penalty associated with the point to be displayed at that location. The collision penalty is a value based on the point's label selection priority. In the exemplary embodiment, the weighted collision array only includes a predetermined number of the most important points from the first list. Area objects and line objects are not included. However, those skilled in the art will appreciate that the weighted collision array can include any combination of object types, including points, areas, lines, or other object types. Accordingly, the weighted collision array identifies which of the points the mapping program will attempt to avoid collisions with, despite not yet being displayed. In contrast, junior objects (including less important points) in the first list, which are not in the second list, will not be considered when labeling an object.

Next, the mapping program begins displaying the points in the first list and labeling all of the objects. The Island 272 is the most important object in the first list and has already been displayed because it is an area. The exemplary embodiment attempts to place the Island label 274 in the most cartographically preferable label position first, the center of the Island 272. There are no collisions between the Island label 274 and other objects either already displayed or yet to be displayed, and, consequently, the Island label 274 is placed in the first label position.

In the exemplary embodiment, a collision occurs when a collision rectangle 279 centered around an object overlaps with a collision rectangle 279 centered around another object. Collision rectangles 279 can be placed around points, lines, areas, labels, or other features which may be drawn. The use of collision rectangles is known to those skilled in the art as a mechanism for identifying collisions between objects. The dashed-line rectangles represent objects which have not yet been displayed while the solid-line rectangles represent objects which have been displayed.

The mapping program then moves to the next object in the first list, which is the national park 290. In the example, the national park 290 is an area and as such has already been displayed. Again, there are no collisions, and the label 291 for the national park 290 is displayed.

The next object in the first list is the capitol city 276. When the mapping program attempts to place the label 277 for the capitol city 276, a collision is encountered with the first minor city 284. Because it has a higher label selection priority than the capitol city 276, the first minor city 284 is a junior object and has not yet been displayed. Accordingly, the mapping program calculates a penalty for that label position. The penalty is a combination of the collision penalty from the weighted collision array associated with the first minor city 284 and a cartographic penalty associated with the label position. Because the label position with which the first minor city 284 collides is the most preferred, the cartographic penalty associated with that label position is the smallest of the available label positions.

The mapping program iteratively evaluates each available label position for the capitol city 276. Because there are no other collisions in the other available label positions for the capitol city 276, the mapping program places the label 277 in the southeast label position. In this manner, the exemplary embodiment labels a more important feature while avoiding a junior object which remains to be displayed. In contrast, most existing mapping programs would simply have labeled the capitol city 276 over the first minor city 284, thereby preventing the display of the first minor city 284.

Next, the mapping program displays and labels the first major city 278. The first label position 292 for the first major city 278 does not collide with any other object, and accordingly, will have the lowest calculated penalty. Because the first label position has the lowest cartographic penalty and because there are no collisions as the mapping program calculates the penalties associated with the other available label positions, the total penalties can only be higher than the first label position. Consequently, the label is placed in the first label position.

Then the mapping program attempts to label the next object in the first list, the second major city 282. The first label position for the second major city 282 now collides with the first major city 278, and accordingly that label position is eliminated as a candidate label position. Unlike the capitol city example above, a penalty is not calculated for the first label position for the second major city 282 because the first major city 278 is a senior object. As mentioned above, in the exemplary embodiment senior objects are not removed or relocated. Consequently, the first label position is simply not available thereby obviating the need to calculate a penalty. This feature of the exemplary embodiment is similar to the greedy algorithm discussed above and contributes to the computational efficiency of the exemplary embodiment by minimizing the number of evaluations which are performed before placing labels in their final positions. However, the exemplary embodiment differs from the greedy algorithm in that the exemplary embodiment creates the weighted collision array for junior objects, which allows the exemplary embodiment to attempt to avoid less important points as well as objects which have already been displayed.

With the first label position for the second major city 282 eliminated, the mapping program evaluates each of the other available label positions beginning with the southeast label position, which collides with the second minor city 286. Therefore, a penalty is calculated for the southeast label position based on both the cartographic penalty associated with the label position and the collision penalty associated with the second minor city 286.

Evaluating the label positions for the second major city 282 results in placing the label in a label position which does not collide with either the first major city 278 or the second minor city 286. Accordingly, the label is placed in the northwest label position 295, which has the lowest calculated penalty.

The mapping program then proceeds to the next object in the first list, the river 288. Various label positions are tried for the river label along the length of the river 288, favoring mostly horizontal lettering and closeness to the center of the river 288. In this case, since there are no collisions with senior or junior objects along the entire length of the river 288, the most preferred cartographic position is chosen.

The mapping program continues with this label evaluation process until all of the objects in the first list which can be labeled have been displayed.

Figure 5:
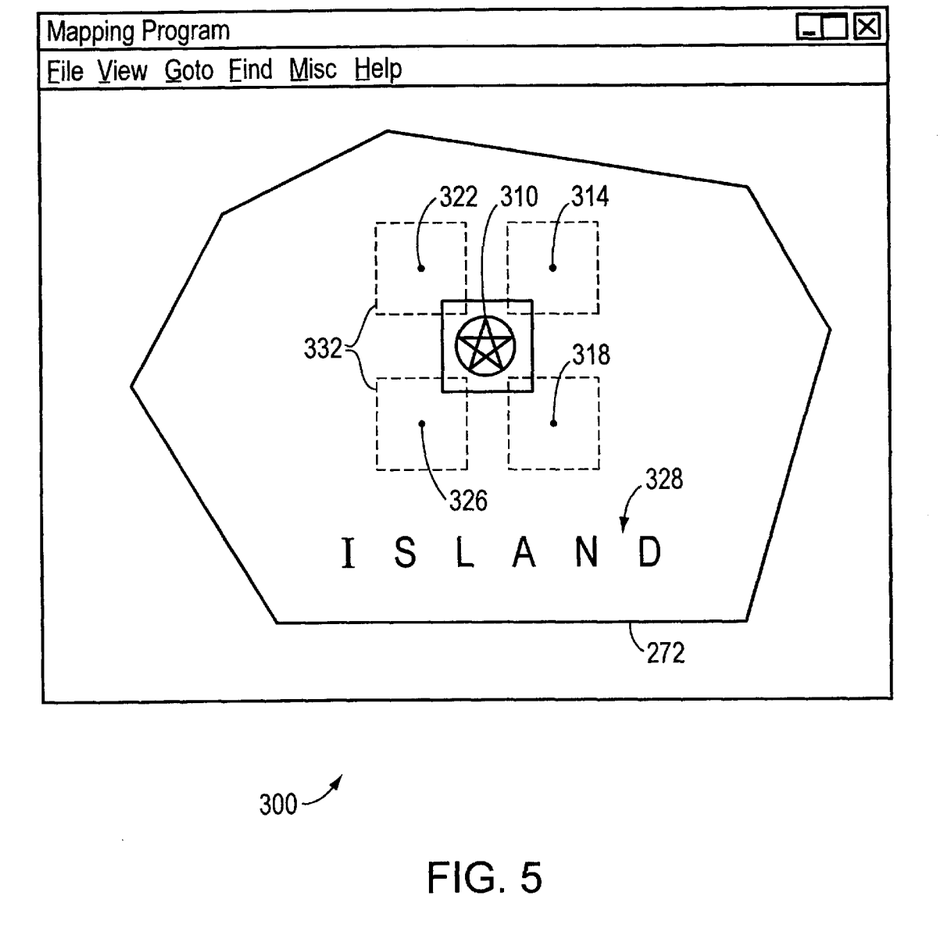
FIG. 5 is an illustration of a screen display showing objects labeled and displayed by a computerized mapping program incorporating an embodiment of the present invention.

FIG. 5 illustrates another sample screen display 300 of a computerized mapping program in accordance with an exemplary embodiment of the present invention. This display 300 depicts a map including an Island 272. The Island 272 includes a plurality of features to display, including a capitol city 310, a first major city 314, a second major city 318, a first minor city 322, and a second minor city 326. Also, the mapping program builds a weighted collision array containing the most important points to be displayed with associated collision penalties based on the point's label selection priority. Again, for ease of discussion, the objects in each of the lists are given in the following tables.

| First List | Second List |
| --- | --- |
| Island 272 | Capitol City 310 |
| Capitol City 310 | First Major City 314 |
| First Major City 314 | Second Major City 318 |
| Second Major City 318 | First Minor City 322 |
| First Minor City 322 | Second Minor City 326 |
| Second Minor City 326 | |

The mapping program of this embodiment initially displays the Island 272. The mapping program attempts to label the Island 272 in the most preferred label position (the center of the area). That position, however, collides with the capitol city 310. Then, the mapping program evaluates the other available labeling positions, which results in placing the label at the lower label position of the Island 272.

The mapping program then attempts to display the next object, which is the capitol city 310. The first label position for the capitol city 310 collides with the first major city 314, which remains to be displayed. For ease of discussion, objects which remain to be displayed are encased within a dashed-line rectangle 332. Accordingly, the mapping program calculates a penalty associated with the collision with the first major city 314. The penalty is a combination of a cartographic penalty associated with the label position and the collision penalty associated with the first major city 314. Those skilled in the art will appreciate that other embodiments of the present invention can weigh the cartographic penalty and the collision penalty differently, such that deviating from the preferred label position may be less desirable than colliding with a junior object having a certain collision penalty.

The mapping program proceeds to evaluate each available label position for the capitol city 310, calculating a penalty at each label position. In the disclosed example, however, there are only four available label positions, each colliding with one of the points to be displayed. For instance, the southeast label position collides with the second major city 318, the northwest label position collides with the first minor city 322, and the southwest label position collides with the second minor city 326. Accordingly, the junior point having the lowest penalty will not displayed.

As the mapping program evaluates each label position, it calculates the associated penalty. Finally, the mapping program determines the label position in which it will place the label for the capitol city 310. The determination is based upon the lowest penalty calculated for the possible label positions.

In the exemplary embodiment, the two most cartographically preferred label positions (the northeast and southeast positions) each collide with a major city. In the exemplary embodiment, major cities have a higher collision penalty than the minor cities, meaning that the label selection priority for major cities is lower than for minor cities. Also, in the exemplary embodiment, the penalty calculation places greater emphasis on the collision penalty than on the cartographic penalty. Consequently, the first major city 314 and the second major city 318 result in lower penalties despite the fact that each resides in a cartographically superior label position.

The first minor city 322 and the second minor city 326 share an equal collision penalty, and consequently the cartographic penalty is decisive of which object is not displaced. In the disclosed example, the northwest label position with which the first minor city 322 collides, has a lower cartographic penalty than the southwest label position with which the second minor city 326 collides. Consequently, the northwest label position has the lowest penalty and is chosen, resulting in the first minor city 326 is not being displayed.

The examples in this discussion are provided for the purpose of disclosure only and should not be interpreted as limiting the present invention. This discussion has not exhausted each combination of label positions and collisions which present themselves to the present invention in the course of use. The examples provided are merely illustrative of certain situations where the present invention overcomes problems in the prior art.

For instance, the exemplary embodiment only seeks to avoid collisions between labels and objects which remain to be displayed. It will be apparent to those skilled in the art that other embodiments of the present invention can be implemented with varying display criteria. For example, by implementing a weighted collision array in an alternative embodiment, the present invention can be utilized to avoid collisions between senior objects and area labels or line labels. Moreover, those skilled in the art will appreciate that alternative embodiments can be implemented which alter the emphasis between the cartographic penalty and the collision penalty of the disclosed embodiments. The present invention should not be limited to implementations in computerized mapping programs, as alternative uses will become apparent to those skilled in the art.

In summary, the present invention can place a label for an object on a computerized map by evaluating possible positions for the label, and placing the label in a position which optimizes the number of objects on the map which can be labeled. Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for drawing map features and associated labels to be displayed on a map, comprising the steps of:

compiling a list of map features to be potentially displayed on a map, the map features comprising point features and non-point features, each feature comprising an associated label positionable in a plurality of potential label positions;

assigning a label selection priority to each feature in the list;

ordering the features in the list in priority order;

drawing the non-point features in the list to a representation of the map; and selecting point features, labels associated with the point features, and labels associated with the non-point features for drawing to the representation of the map by:

a. retrieving a selected feature from the list in priority order;

b. if the label associated with the selected feature can be placed in one or more of the potential label locations for the selected feature without causing a collision with any of the features or associated labels having a higher priority, drawing the label for the selected feature to the representation of the map in one of those locations and, if the feature is a point feature, also drawing the feature to the representation of the map;

c. if the label associated with the selected feature cannot be placed in one of the potential label locations for the feature without causing a collision with any of the features or associated labels having a higher priority, deleting the selected feature from the first list;

d. if the label has been drawn for the selected feature, determining whether there is a collision between the label and one or more point features having a lower priority and, if so, removing the features involved in the collision having the lower priorities from the list; and e. repeating steps a–d until labels for all of the features remaining in the list have been drawn.

2. The method of claim 1, wherein the list is a first list, further comprising the steps of:

compiling a second list comprising selected point features from the first list;

creating a weighted collision array for the features of the second list including a penalty for each feature in the second list; and if there are multiple potential label positions for the selected feature that do not collide with features or labels having a higher priority, determining whether there are collisions between multiple available potential label positions and features having lower priorities, and if so, for each of the available potential label positions, determining a penalty for the label position by identifying one or more features in collision with the label position, obtaining the penalties for the features in collision from the weighted collision array, and those penalties to the label position, and drawing the label for the selected feature in the position having the lowest assigned penalty.

3. The method of claim 2, wherein step (d) further comprises the step of deleting the selected feature from the second list.

4. The method of claim 2, wherein the selected feature is a point feature, further comprising the step of deleting the selected feature from the first list if the selected feature cannot be placed in one of the potential label locations for the feature without causing a collision with any of the features or associated labels having a higher priority.

5. The method of claim 3, wherein step (d) further comprises the steps of:

creating a second representation of the map, mapping all of the features from the second list to the second representation of the map, determining whether there is a collision between the label and one or more point features having a lower priority with reference to the second representation of the map; and the step of determining whether there are collisions between multiple available potential label positions and features having lower priorities comprises the step of referring to the second representation of the map.

6. The method of claim 1, wherein step (b) further comprises the steps of:

assigning cartographic penalties to potential label locations for the selected feature; and selecting the location for drawing the label for the selected feature by selecting one of the label locations with the lowest cartographic penalty.

7. The method of claim 1 wherein the non-point features include area features and line features.

8. The method of claim 2 wherein, for each feature in the second list, the weighted collision array includes:

one or more potential label locations for the feature;
an initial label location for the feature;
a collision rectangle associated with each potential label location for the feature;
a cartographic penalty associated with each potential label location determined by the degree of deviation between its associated collision rectangle and the collision rectangle for the initial location; and
a collision penalty associated each potential label location determined by the degree of overlap between its associated collision rectangle and collision rectangles associated with other features.

9. The method of claim 3, wherein the steps for defining the collision rectangle include:

defining initial dimensions for a rectangular region concentric around the feature;

determining the priority assigned to the feature;
evaluating a density for the map;
increasing the size of the rectangular region in response to a relatively high priority assigned to the feature; and
decreasing the size of the rectangular region in response to a relatively high density for the map.

10. The method of claim 8, wherein the step for determining the label location using the weighted collision array further comprises the steps of:

comparing the penalty of the initial location with the penalty of other potential label locations and choosing the label location associated with a lowest penalty.

11. A method for drawing map features and associated labels to be displayed on a map, comprising the steps of:

compiling a first list of map features to be potentially displayed on a map, the map features comprising point features and non-point features, each feature comprising an associated label positionable in a plurality of potential label positions;

assigning a label selection priority to each feature in the first list;

ordering the features in the first list in priority order;

compiling a second list comprising selected point features from the first list;

creating a weighted collision array for the features of the second list including a penalty for each feature in the second list, and if there are multiple potential label positions for the selected feature, determining whether there are collisions, and for each of the available potential label positions, determining a penalty for the label position by identifying one or more features in collision with the label position, obtaining the penalties for the features in collision from the weighted collision array, and those penalties to the label position, and drawing the non-point features in the list to a representation of the map; and selecting point features, labels associated with the point features, and labels associated with the non-point features for drawing to the representation of the map by:

a. retrieving a selected feature from the first list in priority order;

b. if there are multiple potential label positions for the selected feature that do not collide with features or labels having a higher priority, determining whether there are collisions between multiple available potential label positions and features having lower priorities, and if so, c. if the label associated with the selected feature cannot be placed in one of the potential label locations for the feature without causing a collision with any of the features or associated labels having a higher priority, deleting the selected feature from the first and second lists;

d. if the label has been drawn for the selected feature, determining whether there is a collision between the label and one or more point features having a lower priority and, if so, removing the features involved in the collision having the lower priorities from the first and second lists; and e. repeating steps a–d until labels for all of the features remaining in the list have been drawn.

12. The method of claim 1, further comprising the step of storing the representation of the map in a computer memory.

13. The method of claim 11, further comprising the step of storing the representation of the map in a computer memory.

14. The method of claim 1, further comprising the step of displaying the representation of the map on a display device.

15. The method of claim 11, further comprising the step of displaying the representation of the map on a display device.

16. The method of claim 1, further comprising the step of printing the representation of the map.

17. A computer storage medium storing computer executable instructions for performing the method of claim 1.

18. A computer storage medium storing computer executable instructions for performing the method of claim 11.

19. A computer-controlled device operable for performing the method of claim 1.

20. A computer-controlled device operable for performing the method of claim 11.

\* \* \* \* \*